United States Patent [19]

Nakane

[11] 4,453,412

[45] Jun. 12, 1984

[54] PRESSURE SENSOR

[75] Inventor: Takeshi Nakane, Okazaki, Japan

[73] Assignee: Aisin Seiki Kabushiki Kaisha, Kariya, Japan

[21] Appl. No.: 397,263

[22] Filed: Jul. 12, 1982

[30] Foreign Application Priority Data

Jul. 20, 1981 [JP] Japan .............................. 56-113216

[51] Int. Cl.³ .............................................. G01L 9/10
[52] U.S. Cl. .......................................... 73/728; 336/30
[58] Field of Search .................... 73/728, 722; 336/30; 324/201, 207, 208

[56] References Cited

U.S. PATENT DOCUMENTS 4,339,956  7/1982  Iwasaki .................................. 73/728

Primary Examiner—Donald O. Woodiel
Attorney, Agent, or Firm—Sughrue, Mion, Zinn, Macpeak & Seas

[57] ABSTRACT

A pressure sensor is formed by separating two chambers by a movable member to which is coupled an amorphous metal material. The amorphous metal material is anchored at its other end to be subjected to differing amounts of stress in accordance with movement of the movable member due to pressure changes. The tensile stress applied to the amorphous member is electrically detected, e.g. by detecting the impedance characteristics of an electrical coil adjacent the amorphous member.

2 Claims, 8 Drawing Figures

PRESSURE SENSOR

BACKGROUND OF THE INVENTION

1. Field of the Invention

The invention relates to a pressure sensor for converting a fluid pressure into an electrical signal, and more particularly, to a pressure sensor of the type including a movable body which is subjected to a fluid pressure, causing a displacement of the movable body which is converted into an electrical signal.

2. Description of the Prior Art

A conventional arrangement is known in which a diaphragm is subject to a fluid pressure and is normally urged by a coiled spring against the fluid pressure, the diaphragm being connected to a slider on a potentiometer. In this arrangement, the potentiometer provides an analog voltage corresponding to the amount of movement of the diaphragm when the latter is subjected to a fluid pressure. In this pressure sensor, it is desirable for a thin film resistor forming the potentiometer to have a low sliding friction and provide a stable output voltage for a given slider position. It is also desirable that the movable body and the slider by mechanically connected together with a minimal degree of rattling and that a stabilized contact be maintained between the slider and the thin film resistor in the presence of oscillations or shocks. However, because the slider is brought into contact with the thin film resistor under pressure, friction or oscillations may cause an unstable output voltage to be produced at any particular measured fluid pressure.

Recently, significant advances in semiconductor pressure sensors have led to a sensor which includes a semiconductor strain gauge constructed so that a change in the gauge resistance which occurs in response to a pressure applied thereto is converted into an analog voltage. In this arrangement, the semiconductor strain gauge is very small in size. However, since a detecting signal which occurs in accordance with the pressure is very small and since temperature drift may be large, this arrangement requires a complex circuit for amplifying the detecting signal and compensating for adverse influences of temperature drift. In addition, the semiconductor is significantly affected by friction or oscillations.

SUMMARY OF THE INVENTION

Accordingly, one object of this invention is to provide a novel pressure sensor including non-contact pressure conversion means in which no mechanical contact mechanism is involved in the mechanical-to-electrical conversion system which converts a mechanical displacement into a corresponding electrical signal.

A further object of the invention is to provide a novel pressure sensor of high mechanical strength and which is also highly resistant to oscillation and shock.

Yet another object of the invention is to provide a novel pressure sensor which requires only a relatively simple electrical processing of its pressure detection signal.

Still another object of the invention is to provide a novel pressure sensor capable of reading out pressure data by means of relatively simple read-out logic in the form of a large scale integrated circuit such as a microcomputer.

These and other objects are achieved by a novel pressure sensor according to the present invention wherein an internal space of a casing is divided by a movable body into a first space in which a fluid, the pressure of which should be measured, is introduced, and a second space in which a fluid of constant pressure such as atmospheric pressure is received. A member of a magnetically soft amorphous material having an electrical coil wound thereon is arranged in one of the spaces, one end of the amorphous member being connected to the movable body and the other end being connected to a tensile stress adjustment.

The saturated flux density of the amorphous member changes in accordance with the amplitude of the applied tensile stress and is a high magnitude for a high magnitude of applied tensile stress and is low in magnitude for a low tensile stress. Therefore, the impedance of the electrical coil is high when the tensile stress is high and low when the tensile stress is low. The movable body receives a fluid pressure an then produces a corresponding tensile stress in an amorphous member so that the electrical coil disposed on the amorphous member exhibits an impedance in accordance with the fluid pressure. In the first embodiment of the pressure sensor according to the invention, the impedance of the electrical coil is converted into a voltage to thereby detect the fluid pressure. When a pulse voltage is applied to the coil wound on the member, a current flow through the coil is initially a low level, but after the magnetic flux of the member becomes saturated, the current flow becomes high since the impedance of coil is suddenly decreased. Because the saturated flux density, as above mentioned, depends on the tensile stress produced in the amorphous member, which tensile stress is varied by the fluid pressure, the rise time of the current flow through the coil changes corresponding to the fluid pressure.

In another embodiment of the invention, fluid pressure detection is obtained by measuring the period between the time of application of the voltage to the coil and the rise time of a current flow through the coil.

Figure 2:
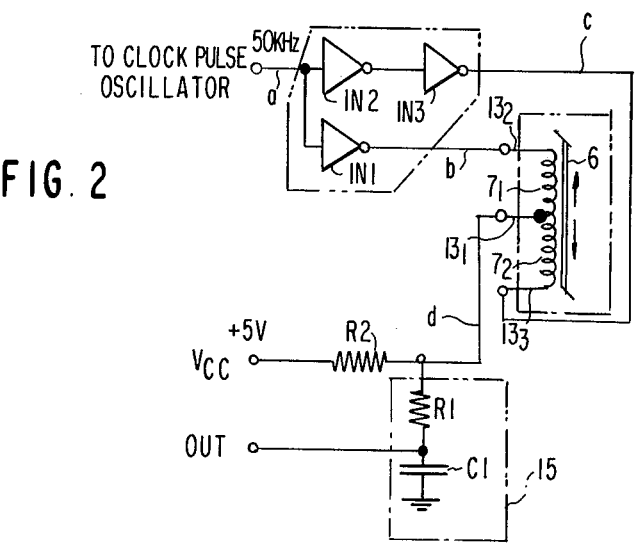
FIG. 2 is a circuit diagram of an electrical processing circuit which is connected to the electrical coil of the pressure sensor shown in FIG. 1 to produce an analog voltage of a level which depends on the pressure detected.

1 with the electrical processing circuit shown in FIG. 2; and

Figure 1:
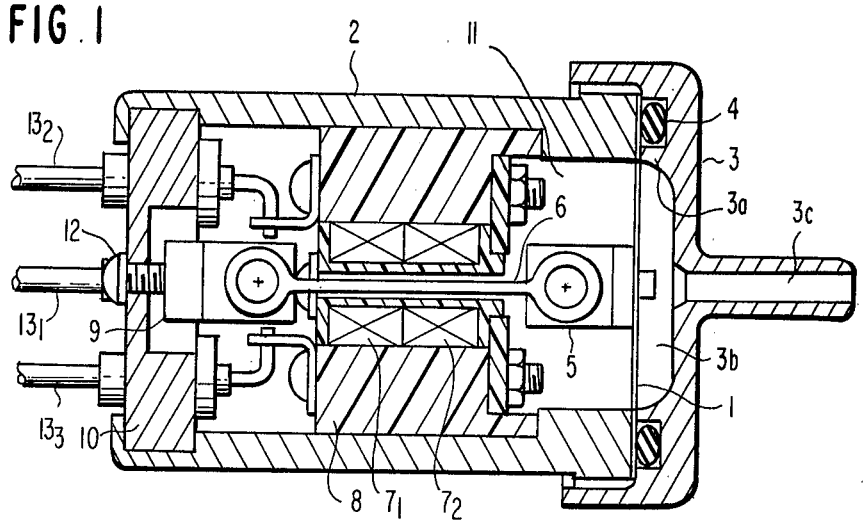
FIG. 1 is a longitudinal cross-sectional view of a pressure sensor according to an embodiment of the invention.
Figure 5:
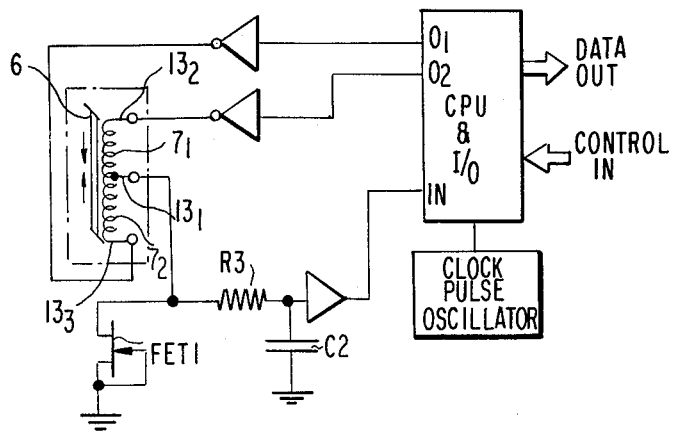

FIG. 5 is another circuit diagram of an electrical processing circuit which may be connected to the electrical coil of the pressure sensor shown in FIG. 1.

DETAILED DESCRIPTION OF THE PREFERRED EMBODIMENT

Referring to FIG. 1, which illustrates an embodiment of the pressure sensor according to the present invention, a movable body 1 formed of a thin disc of phosphor-bronze material is arranged between an end of a casing 2 and a cap 3 for the casing 2, and is pushed against the end of the casing 2 by an annular projection 3a of the cap 3. An O-ring 4 is positioned within a groove provided in the inner face of the cap 3 and is pushed against the disc 1 to thereby airtightly seal an inner space (a first space) 3b of the cap 3. The cap 3 has an inlet port 3c in communication with the inner space 3b.

A connector 5 is secured to the center of the disc 1 and is also connected to one end of a member 6 of magnetically soft amorphous metal material. The member 6 extends through a coil bobbin 8 having electrical coils $7_1$, $7_2$ wound in the same direction and in series and disposed on the peripheral surface of the bobbin 8, the other end of member 6 being connected to another connector 9. The left end of the casing 2 is caulked to thereby hold the casing to the casing base 10, but the caulking is not airtight and atmospheric air may pass through the above caulking portion into a second space (a second inner space) 11 defined by the disc 1, the casing 2 and the base 10. The shank of a screw 12 which extends through the base 10 is threadingly engaged with the connector 9 in the inner space 11. Therefore, as the screw 12 is tightened, the initial value of tensile stress applied to the member 6 is increased, while as the screw 12 is loosened the tensile stress is decreased. Thus, the screw 12 functions to set the initial tensile stress which is applied to the member 6 and to calibrate the device.

The composite coil comprises 400 successively wound turns, with the middle defining on either side thereof the electrical coils $7_1$ and $7_2$ (each coil is 200 turns). A d.c. supply voltage terminal at the middle of the coil is connected with a lead line $13_1$, and ground terminals are connected with lead lines $13_2$ and $13_3$, respectively.

FIG. 2 shows one form of electrical processing circuit which may be connected with the electrical coils $7_1$, $7_2$. The circuit 14 is a switching circuit including an inverting amplifier IN1 connected to the electrical coil $7_1$ and a pair of inverting amplifiers IN2 and IN3 connected to the electrical coil $7_2$. The other ends of the electrical coils $7_1$, $7_2$ as well as smoothing circuit 15, are connected to a d.c. supply voltage Vcc through a registor R2. In this embodiment, the inverting amplifiers IN1 and IN2 receive a voltage pulse having a duty cycle of 50% and a frequency on the order of 50 KHz. During the time the pulse voltage remains at a high level or "1", the inverting amplifier IN1 is turned on and the one end of the electrical coil $7_1$ is grounded, while the inverting amplifier IN2 is turned on and the inverting amplifier IN3 is turned off, so that the one end of the other electrical coil $7_2$ is open. Therefore, while the input pulse voltage is a high level, or "1", electric current flows through the electrical coil $7_1$, but cannot flow through the electrical coil $7_2$. On the contrary, when the input pulse is at a low level, or "0", the electric current cannot flow through the electrical coil $7_1$ but instead flows through the electrical coil $7_2$. Thus, the electrical coils $7_1$ and $7_2$ are rendered alternately conductive.

Figure 3A:
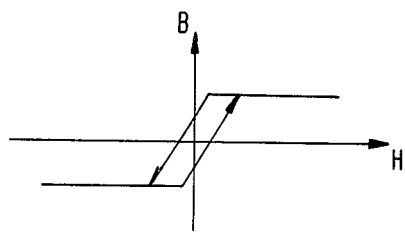
FIG. 3a is a graph which illustrates the magnetizing curve of the magnetically soft amorphous metal material in the case where a low magnitude tensile stress is applied.
Figure 3B:
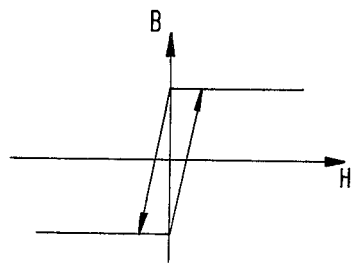
FIG. 3b is a graph which illustrates the magnetizing curve of the magnetically soft amorphous metal material in the case where a high magnitude tensile stress is applied.

The electrical coils $7_1$ and $7_2$ exhibit a high impedance level before their current reaches a level corresponding to the saturated flux density of the amorphous member exhibit and when the input pulse voltage reaches this level the electrical coils $7_1$ and $7_2$ indicate a low impedance level. FIG. 3a is a graph of the magnetization curve of the amorphous member when the applied tensile stress is low. When the magnitude of the applied tensile stress is high, the saturated flux density is high as shown in FIG. 3b. Thus, with a low tensile stress applied, the saturated magnetic flux density will be low and the amorphous member will reach its saturation level faster, thus resulting in a faster increase in the current flow. In contrast, if the applied tensile stress is high, the amorphous member will reach its saturation level after a longer period of time and will therefore cause the current flow to rise more slowly.

Figure 4A:
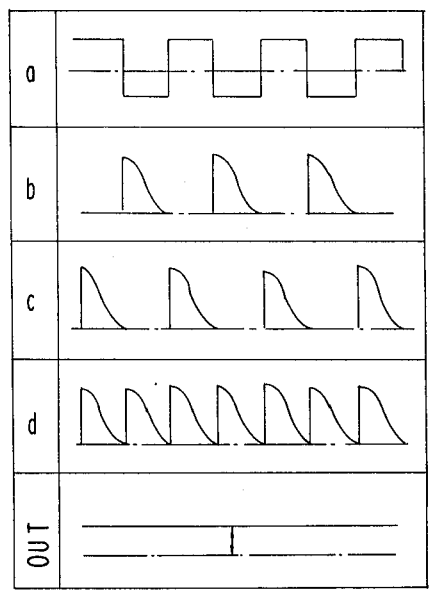
FIG. 4a is a graph which illustrates the waveforms of the signals of the electrical processing circuit shown in FIG. 2 when the magnitude of tensile stress applied to the amorphous metal is low.
Figure 4B:
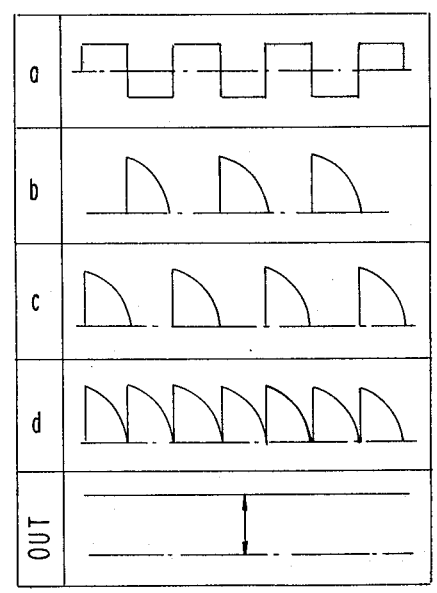
FIG. 4b is a graph which illustrates the waveforms of the signals of the electrical processing circuit shown in FIG. 2 when the magnitude of tensile stress applied to the amorphous metal is high.
Figure 4C:
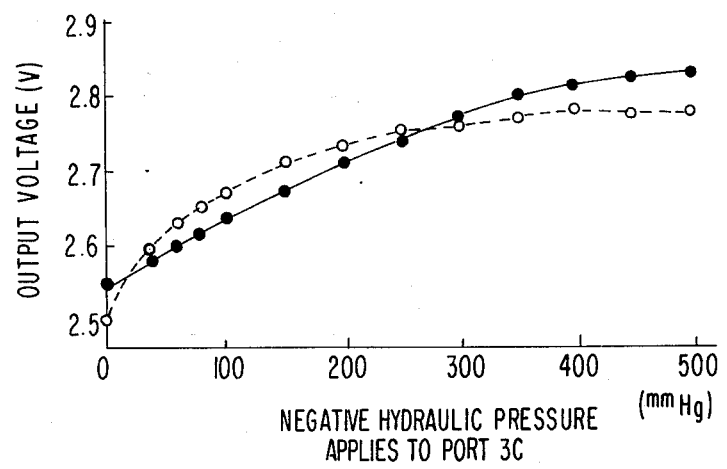
FIG. 4c is a graph which illustrates data indicative of the output voltage Vout with respect to the negative pressure which is obtained by the sensor shown in FIG.

FIG. 4a shows the various waveforms of the voltage of the circuit shown in FIG. 2 when the magnitude of the applied tensile stress is low, and FIG. 4b shows the various waveforms of the voltages when the magnitude of the tensile stress is high. These voltages appear as pulse shape synchronized with the turning on and off of the inverting amplifiers IN1 and IN3. The voltage d appearing at the junction of the electrical coils $7_1$ and $7_2$ is converted into a stable d.c. signal by the smoothing circuit 15. FIG. 4c shows experimental data. In FIG. 4c, the relationship between the output voltage (OUT) and the input negative pressure is changed by adjustment of the screw 12. The data of FIG. 4c was taken with a given d.c. supply volage Vcc=+5 V, a resistor R2=50 $\Omega$, a resistor R1=30K$\Omega$ and capacitor C1=0.3 $\mu$F, with the line of black dots illustrating the case where one sheet of 50 $\mu$m thickness is used for the amorphous member 6, and the line of white data illustrating the case where three sheets of 50 $\mu$m thickness are used for the amorphous member 6.

In the above mentioned embodiment, the coil which is successively wound is defined on either side of its center as a pair of coils $7_1$, $7_2$, and the input pulse voltage is alternately applied to the coils $7_1$ and $7_2$ to thereby alternately reverse the direction of the magnetic field applied to the member 6. This is to prevent experimental errors due to external magnetic field. For instance, when some external magnetic field is applied to the amorphous member 6, it causes the member 6 to receive a bias magnetic field. If the magnetic fields of the electrical coils $7_1$, $7_2$ working in the same direction are applied to the amorphous member 6, the impedance of the electrical coils $7_1$, $7_2$ is shifted in proportion to the bias magnetic field, and the level of the output voltage (OUT) also is proportionally shifted. In this embodiment, however, the direction of the magnetic field of the electrical coil $7_1$ is made opposite to that of the electrical coil $7_2$, and therefore the bias magnetic field causes an increase in the impedance of one electrical coil ($7_1$, for example) while simultaneously causing a decrease in the impedance of the other electrical coil ($7_2$). Thus, the output voltage (OUT) corresponding to the average of both impedances cancels the influence of the bias magnetic field. This means that the output voltage (OUT) is substantially uneffected by the external magnetic field.

FIG. 5 illustrates another electrical processing circuit. In this instance, a single chip microcomputer (a large scale integrated semiconductor unit) alternately supplies the voltages to the electrical coils $7_1$, $7_2$ and counts higher frequency clock pulses which are developed during the period between the time the leading edge of the pulse is outputted by itself and the time the current flow rises to a given level, and averages the time required for the current to rise when the input voltage is applied to the electrical coil $7_1$ and the time required for the current to rise when the input voltage is applied to the electrical coil $7_2$, and forms an output code (DATA OUT). The junction $13_1$ between the electrical coils $7_1$ and $7_2$ is grounded through a junction-type N-channel field effect transistor FET 1 connected for constant current so that the voltage of the junction $13_1$ rises immediately when the magnetic field applied to the amorphous member 6 by the electrical coils $7_1$, $7_2$ exceeds the magnitude corresponding to the saturated magnetic flux density. The junction $13_1$ is connected to a filter circuit comprising a resistor R3 and a condenser C2 which is a low pass filter for removing high-frequency voltage oscillations. Also, FET 1 may be replaced with a resistor by which a current flow through the electrical coil can be converted into a voltage. The computer can count the clock pulses which are developed during the period between the time the electrical coil receives the leading edge of the pulse and the time the voltage of this resistor rises to a given level.

As described above, the pressure sensor of this invention is simple in its mechanical structure and has an excellent durability, and its electrical processing circuit may be quite simple.

While in the described embodiments, a negative hydraulic pressure is supplied to the hydraulic pressure detecting port 3c, and a negative hydraulic pressure is detected by the electrical coils $7_1$, $7_2$, it should be obvious that the pressure sensor may detect a change in the positive pressure wherein the second inner space 11 will be air-tight, a hydraulic pressure detecting port is formed on the base 10 or the casing 2 to thereby receive the positive pressure and the port 3c receives atmospheric pressure. Also, if a first inner space 3b receives one hydraulic pressure and the second inner space 11 receives another hydraulic pressure, the pressure sensor may be arranged to detect a difference in pressure therebetween. It also will be apparent that the coil of 400 turns previously mentioned may be divided into two independent coils.

What is claimed is:

1. A pressure sensor, comprising:

a casing;

a movable member disposed in said casing to divide said casing into a first space and a second space, one of said first and second spaces receiving a pressure to be measured and the other of said first and second spaces receiving a reference pressure;

an amorphous member of magnetically soft metal material coupled at one end to said movable member and secured at another end thereof, whereby said amorphous member is subjected to differing tensile stress in accordance with movement of said movable member; and stress detection means for electrically detecting the tensile stress applied to said amorphous member said detection means comprising an electrical coil having two electrical coil portions for applying magnetic fields to said amorphous member in opposite directions in response to signals applied thereto, means for applying an intermittent signal to said electrical coil, and impedance detection means for detecting the impedance of said coil.

2. A pressure sensor, comprising:

a casing;

a movable member disposed in said casing to divide said casing into a first space and a second space, one of said first and second spaces receiving a pressure to be measured and the other of said first and second spaces receiving a reference pressure;

an amorphous member of magnetically soft metal material coupled at one end to said movable member and secured at another end thereof, whereby said amorphous member is subjected to differing tensile stress in accordance with movement of said movable member; and stress detection means for electrically detecting the tensile stress applied to said amorphous member, said detection means comprising a first electrical coil adjacent said amorphous member for applying a magnetic field to said amorphous member in response to an intermittent signal, a second electrical coil disposed adjacent said amorphous member for applying a magnetic field to said amorphous member in a direction opposite to the magnetic field applied by said first electrical coil in response to said intermittent signal, means for applying said intermittent signal to said electrical coils, and impedance detection means for detecting the impedance of said coils.

* * * * *